United States Patent [19]

Levy et al.

[11] Patent Number: 4,992,073
[45] Date of Patent: Feb. 12, 1991

[54] ACCESSORIES FOR USE IN APICULTURE

[75] Inventors: Uri Levy, Holon; Giora Sha'ar, Haifa, both of Israel

[73] Assignee: B-Horizon Limited, Holon, Israel

[21] Appl. No.: 277,781

[22] Filed: Nov. 30, 1988

[30] Foreign Application Priority Data

Dec. 3, 1987 [IL] Israel .................................... 84698

[51] Int. Cl.⁵ ........................ A01K 47/04; B32B 3/12
[52] U.S. Cl. ................................ 449/44; 264/177.12; 428/116
[58] Field of Search ................ 449/42, 44, 45, 30, 449/43; 428/116, 118; 264/177.12

[56] References Cited

U.S. PATENT DOCUMENTS

| | | | |
|---|---|---|---|
| 2,331,231 | 10/1943 | Root et al. | 428/116 X |
| 2,561,147 | 7/1951 | Smith | 428/116 X |
| 3,836,302 | 9/1974 | Kaukeinen | 428/116 X |
| 3,837,991 | 9/1974 | Evans | 428/118 |
| 3,864,196 | 2/1975 | Schmidt | 449/44 |
| 3,968,531 | 7/1976 | Cartwright | 449/30 |
| 4,134,243 | 1/1979 | Fries | 428/116 X |
| 4,315,050 | 2/1982 | Rourke | 428/116 |
| 4,329,749 | 5/1982 | Hogg | 449/17 |
| 4,374,440 | 2/1983 | Drapkin | 428/116 X |
| 4,651,372 | 3/1987 | Schmidt | 449/44 X |
| 4,718,134 | 1/1988 | Ashby | 449/28 |
| 4,802,840 | 2/1989 | Fukuda et al. | 264/177.12 X |

FOREIGN PATENT DOCUMENTS

| | | | |
|---|---|---|---|
| 0322086 | 6/1989 | European Pat. Off. | 428/118 |
| 16787 | 4/1963 | Israel . | |
| 46512 | 1/1976 | Israel | 428/116 |

Primary Examiner—Henry F. Epstein
Attorney, Agent, or Firm—Bernard Malina

[57] ABSTRACT

Beehive accessories are disclosed including artificial honeycomb, foundation units, covers, bottom boards, queen excluders, queen cages, cell cups and the like. These components are formed as a solid homogeneous mass from polypropylene copolymer and from 7.5 to 15% by weight of a wax.

8 Claims, 2 Drawing Sheets

ACCESSORIES FOR USE IN APICULTURE

BACKGROUND OF THE INVENTION

1. Field of the Invention

The present invention concerns accessories for use in apicultures such as various beehive components, artificial cell cups for starting queen cells and the like.

2. The Related Art

Under natural conditions, honey bees build up honeycomb cells for depositing the brood and stores of honey. In apiculture it has become accepted practice to relieve the bees of part of their work in that artificial honeycomb foundations are provided whereby honey production is increased. One type of known honeycomb foundation consists in a thin plate of wax which is mounted on a wooden frame and supported by metal wires stretched across the frame and fused into the plate, and has on both sides preformed hexagonal depressions serving as starting points for the bees to build up the honeycomb cells. In Israel patent specification No. 16787 there is described an artificial honeycomb foundation constituted by a plate which has performed depressions serving as starting points for the formation of honeycomb cells and is made of synthetic plastic material in one piece with a frame of a generally conventional design, equally consisting of synthetic plastic material. Before use these frame-foundation units are spread with a thin layer of wax on both sides in order to induce the bees more rapidly to start building up the cells.

Another kind of artificial honeycomb foundation units is described in Israel patent specification 46512. These foundation units are made of either polyacrylonitrile or polypropylene and are precoated with a thin wax layer. Foundation units according to Israel patent No. 46512 are widely used and are known in the art as Ferman foundations.

The need to coat a beehive component such as an artificial honeycomb foundation unit with wax prior to use has several disadvantages. For one, it adds another operation which has to be performed before the component such as an artificial honeycomb foundation unit can be inserted into a beehive. Furthermore, during handling such as the extraction of honey from the combs by mechanical stripping operations and centrifugation, the wax coating might be damaged and when damaged has to be renewed after honey extraction. Still further, where there occurs a disease in the beehive the various components thereof have to be disinfected, which as a rule is done with boiling disinfectant solutions, whereby their wax coat is melted and removed. Consequently a new wax coating must be applied before the honeycomb foundation unit can be reused. Some beehive components such as a honeycomb foundation unit must be periodically disinfected even where there is no apparent infection, which gives rise to similar problems.

It is accordingly one object of the present invention to provide beehive components that do not have to be wax coated.

It is common practice in apiculture to use artificial cell cups for commercial queen rearing. Various kinds of artificial cell cups are known. One kind comprises cell cups made from beeswax and for support held within wooden cups while another kind is self-supporting and is made from plastic material coated with beeswax. In either case the production of artificial cell cups and their introduction into a colony for queen rearing are tedious operations and it is therefore a further object of the present invention to provide a new type of artificial cell cups.

In the prior art apiculture accessories such as beehive components and cell cups, the metal wires extending across a wooden frame or the plastic material foundation units serve as carriers only, while the substrate with which the bees are in direct contact, is wholly wax. It has in fact been generally believed that this arrangement is a condition sine qua non for attracting the bees to the substrates so as to perform their proper functions such as brood deposition and honey storage in the case of a beehive, and building a queen cell in case of a cell cup. The present invention is based on the surprising observation that equivalent and sometimes even better results can be obtained by using for the manufacture of apiculture accessories a homogeneous moldable mixture comprising a synthetic polymeric or copolymeric material together with an effective amount of a wax.

In the following specifications and claims the terms "polymer" and "polymeric" are meant to denote both homopolymers and copolymers.

GENERAL DESCRIPTION OF THE INVENTION

Based on this surprising observation the invention provides apiculture accessories made of a solid homogeneous material comprising at least one synthetic polymer and an effective amount of wax.

As distinct from the prior art, beehive components according to the invention are manufactured in a single-step and can be used indefinitely with intermittent stripping and disinfaction without any detriment to the quality or performance.

Disposable accessories according to the invention such as cell cups for queen rearing excel over similar prior art accessories in that they can be mass produced in uniform and reliable quality.

A few examples of polymers that can be used for the purpose of the present invention are homopolypropylene, propylene copolymer, low density polyethylene, high density polyethylene, high impact polystyrene, acryllabutadiene-styrene copolymer, polyacrylonitrile; and there may be many others.

Any wax that is used in the prior art for coating artificial comb foundations can be used for the purposes of the present invention, examples being beeswax, brooder wax, various kinds of artifical wax, etc. and it is possible in accordance with the invention to use in one accessory more than one kind of wax.

For making apiculture accessories according, to the invention a moldable homogeneous composition is prepared comprising at least one polymer and at least one wax. Accessories can then be molded therefrom and cured. Molding can be accomplished through various known techniques. A particularly suitable method is extrusion.

The relative proportions of polymer and wax depend among others on the required mechanical properties of the accessories. Where, for example, the accessory concerned is subject to wear and tear and should thus be relatively hard, e.g. in case of various hard components such as honeycomb foundation units, various covers, bottom boards and queen excluders, the relative proportion of the wax should be comparatively low. On the other hand, in cases of accessories which are not subjected to mechanical wear and tear such as queen cages as well as disposable accessories such as cell cups, the relative proportions of the wax may be higher.

Experiments conducted in accordance with the invention have shown that useful accessories can be made from compositions in which the relative proportion of wax is within the range of from 2.0-30% by weight.

Depending on the nature of the ingredients, the said homogeneous material may have such mechanical properties as to make it suitable for any type of apiculture accessories according to the invention. An example of such a material is one consisting of about 90% by weight of a polypropylene copolymer and about 10% by weight of bees wax. Such a material combines desired mechanical strength with excellent attractivity to bees and is thus suitable for making honeycomb foundation units, covers, bottom boards, queen excluders, as well as queen cages and cess cups.

BRIEF DESCRIPTION OF THE DRAWINGS

For better understanding the invention will now be described, by way of example only, with reference to the annexed drawings in which.

BRIEF DESCRIPTION OF PREFERRED EMBODIMENT

Figure 1:
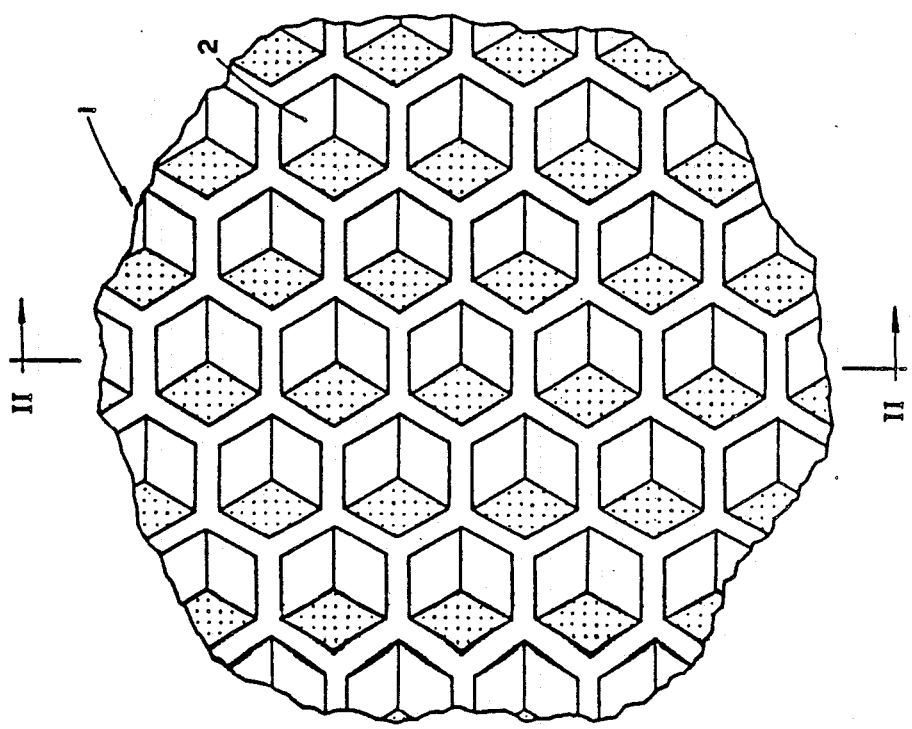
FIG. 1 is a fragmentary plan view of a honeycomb foundation unit according to the invention.
Figure 2:
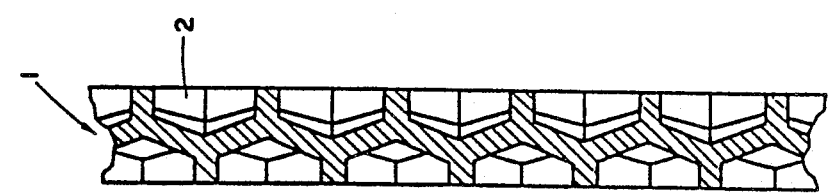
FIG. 2 is a section along II—II of FIG. 1.

The honeycomb 1 of a foundation unit according to the invention shown in FIGS. 1 and 2 is monolytic and characterized by the absence of any coating. It comprises a plurality of cavities 2 with hexagonal contours, as known per se.

Figure 3:
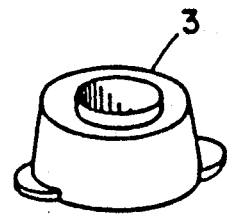
FIG. 3 is a perspective view of a cell cup according to the invention.

FIG. 3 shows a typical cell cup according to the invention used for commerical queen rearing. Like the honeycomb foundation unit of FIGS. 1 and 2, cell cup 3 is also monolytic and does not have any coating.

Figure 4:
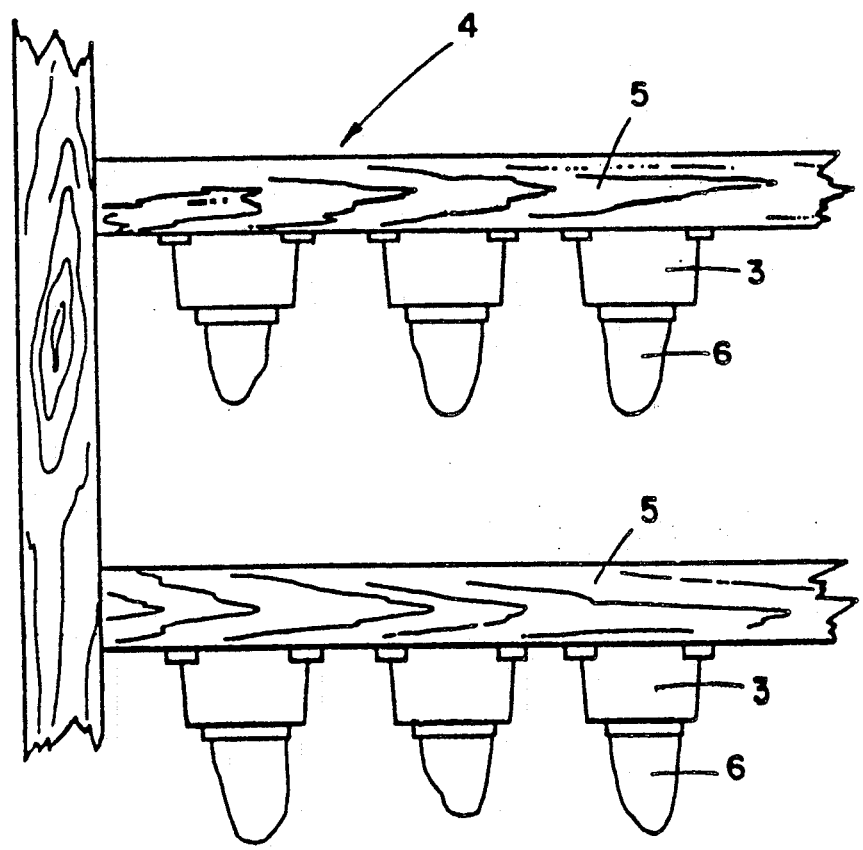
FIG. 4 is a fragmentary elevation of a wooden frame with depending queen cells grown on cell cups according to the invention.

The manner in which cell cups 3 are used for commerical queen rearing is shown in FIG. 4. As shown, cell cups 3 hang from cross-bars 5 of a wooden frame 4. Queen cells 6 grow on the cell cups in the downward direction.

The usefulness of the present invention was demonstrated by the following tests. In all these tests the term "polypropylene copolymer" refers to a propylene-ethylene copolymer produced by ICI under the designation GYM 121.

Test No. 1

Three groups of different honeycomb foundation units each consisting of ten units were inserted for 14 days in the queen section of a beehive for brooding purposes. The units of the first group consisted of wood frames with wax foundations mounted therein. A second group consisted of integral, wax coated prior art polypropylene honeycomb foundation units. A third group consists of honeycomb foundation units according to the invention prepared by extrusion from a moldable composition consisting of 90% by weight of polypropylene copolymer and 10% by weight of beeswax. At the end of the period it was established that the queen had laid eggs in all honeycomb units in the same amounts with even distribution. Also the bees attended and fed and built cells in all the 30 honeycomb foundation units in the same way. All this means that from the point of view of performance the honeycomb foundation units according to the invention are equivalent to the prior art ones while being superior thereto in other respects as described hereinbefore.

Test No. 2

On a wooden frame such as frame 4 in FIG. 4 comprising three cross-bars 5, five groups of cell cups 3 were mounted in such a way that when the frame was placed vertically the cell caps were depending with their open side directed downward, as shown in FIG. 4.

The following is a description of the groups:
Group A—10 wooden cell cups with beeswax coating;
Group B—17 plastic cell cups with beeswax coating;
Group C—9 cell cups of polypropylene copolymer/beeswax=99:1 (w/w);
Group D—10 cell cups of polypropylene copolymer/beeswax=90:10 (w/w);
Group E—11 cell cups of polypropylene copolymer/beeswax=96:4 (w/w).

The cell cups of groups A and B were prior art while those of groups C, D and E were according to the invention.

All cell cups were of equal size and in each of them there was introduced one drop of royal jelly and one two days old larva. Each frame was placed in a queenless behive for one week and the resulting queen cells were counted. The following are the results:

| Group | No. of queen cells | Success Rate (%) |
|-------|-------------------|------------------|
| A | 6 | 60.00 |
| B | 12 | 70.59 |
| C | 6 | 66.66 |
| D | 10 | 100.00 |
| E | 10 | 90.09 |

It is seen from the above table that the cell cups according to the invention which contained only 1% of beeswax performed about as effectively as conventional wooden cell cups with beeswax coating and not quite as well as conventional plastic cell cups with beeswax coating. However, the performance of cell cups according to the invention which contained 4 and 10% by weight of beeswax was superior to that of the conventional cell cups of groups A and B.

Test No. 3

Test No. 2 was repeated with similar cell cups after one year's storage and similar results were obtained. This shows that one year ageing does not affect the performance of the materials from which apiculture accessories according to the invention are made.

Test No. 4

Test No. 2 was repeated with similar cell cups which, however, prior to use were boiled with caustic soda for 30 minutes. The cups were weighed before and after boiling and the weight was the same within an accuracy of 1/10 gram, which shows that the material is stable and the wax is not readily extracted therefrom. The performance was as described in Test No. 2, with similar results.

Test No. 5

Artificial honeycomb foundations were prepared from the following materials:

| Designation | Polypropylene copolymer % w/w | Beeswax % w/w |
|---|---|---|
| F | 100 | 0 |
| G | 95 | 5 |
| H | 87.5 | 12.5 |
| I | 75 | 25 |

50 Foundations of each group were introduced into beehives in the fall and after two months the area covered by orderly wax deposition was assessed, the term "orderly wax deposition" meaning a deposition in which the honeycomb structure begins at the bottom of a hexagonal depression of the foundation. Group F was a control group while Groups G, H and I were according to the invention.

The following are the average results:

| Group | % of Coverage by Orderly Wax Deposition |
|---|---|
| F | 3 |
| G | 10 |
| H | 85 |
| I | 50 |

It follows from the above results that group H was the one most attractive to the bees and that suprisingly an increase of the beeswax contents of the material of which the frame-foundations were made decreased the attractivity of the resulting foundation to bees rather than increasing it as would have been expected. It thus follows that for each synthetic polymer/wax pair of which the material for the apiculture accessories according to the invention is made, there exists and optimum range of relative amounts within which the attractivity to bees is highest.

Test No. 6

Artificial honeycomb frame-foundations were made from the following materials:

| Designation | Polypropylene copolymer % w/w | Bees Wax % w/w |
|---|---|---|
| J | 100 | 0 |
| K | 92.5 | 35 |
| L | 90 | 10 |
| M | 85 | 15 |

200 Frame-foundations of each group were tested in the spring with the control group J being totally covered with beeswax so that these foundations were actually pure beeswax.

Similar as in Test No. 5 the percentage of orderly wax deposition was assessed after one month and the results were as follows:

| Group | % of Coverage by Orderly Wax Deposition |
|---|---|
| J | 88 |
| K | 84 |
| L | 89 |
| M | 86 |

It follows from the above results that materials K, L and M were of similar efficacy the performance being about the same as that of pure beeswax, (control group J), the performance of group L being the best. By extrapolation it can be concluded that if the percentage of beeswax is reduced below 7.5% by weight or increased above 15% by weight the efficacy will be lowered.

The moldable compositions from which were prepared the tested honeycomb foundations of groups K. L and M were formulated 10 months prior to making the honeycomb foundations therefrom. This shows that a 10 months' storage of the moldable compositions did not affect the efficacy of the honeycomb foundations.

We claim:

1. A molded apiculture accessory comprising a solid homogeneous mass of polypropylene copolymer and from 7.5 to 15% by weight of beeswax, said accessory being selected from the group consisting of honeycomb foundation units, beehive covers, behive bottom boards, behive queen excluders, beehive queen cages, beehive cell cups and combinations thereof.

2. An accessory according to claim 1, being a beehive component.

3. An accessory according to claim 2 being honeycomb foundation unit.

4. An accessory according to claim 1, being a disposable unit.

5. An accessory according to claim 4 being a cell cup for queen rearing.

6. An accessory according to claim 1 comprising about 90% of polypropylene copolymer and about 10% of beeswax.

7. A method for manufacturing an apiculture accessory comprising:
    preparing a solid homogeneous mass comprising polypropylene copolymer and from 7.5 to 15% by weight of beeswax;
    molding said mass into a desired shape of said apiculture accessory; and
    curing said molded accessory, said accessory being selected from the group consisting of honeycomb foundation units, beehive covers, beehive bottom boards, beehive queen excluders, beehive queen cages, beehive cell cups and combinations thereof.

8. A method according to claim 7 wherein the accessory is molded by extrusion.

* * * * *